(12) United States Patent
Chaix et al.

(10) Patent No.: US 8,543,267 B2
(45) Date of Patent: Sep. 24, 2013

(54) SYSTEM AND METHOD FOR MERGING METEOROLOGICAL DATA PREDICTED AND MEASURED ON AN AIRCRAFT

(75) Inventors: Philippe Chaix, Tournefeuille (FR); Alex Bourdon, Toulouse (FR); Alexandre Grattard, Plaisance du Touch (FR)

(73) Assignee: Thales, Neuilly sur Seine (FR)

( * ) Notice: Subject to any disclaimer, the term of this patent is extended or adjusted under 35 U.S.C. 154(b) by 832 days.

(21) Appl. No.: 12/553,305

(22) Filed: Sep. 3, 2009

(65) Prior Publication Data
US 2010/0076629 A1  Mar. 25, 2010

(30) Foreign Application Priority Data
Sep. 5, 2008 (FR) .................................. 08 04878

(51) Int. Cl.
*G06F 7/70* (2006.01)
*G06F 19/00* (2011.01)
*G06G 7/76* (2006.01)

(52) U.S. Cl.
USPC ............. 701/14; 701/400; 701/445; 701/527; 701/534

(58) Field of Classification Search
USPC .................... 701/14, 400, 445, 527, 534
See application file for complete search history.

(56) References Cited

U.S. PATENT DOCUMENTS

| | | | |
|---|---|---|---|
| 4,774,670 A | | 9/1988 | Palmieri |
| 5,051,910 A | * | 9/1991 | Liden .......................... 701/465 |
| 2004/0078136 A1 | | 4/2004 | Cornell et al. |

OTHER PUBLICATIONS

Petr Casek et al., "Analysis of FMS-Generated Trajectory Prediction Accuracy and Sensitivity", Digital Avionics Systems Conference, Oct. 1, 2007, pp. 1.C.1-1-1.C.1-12.*

* cited by examiner

*Primary Examiner* — Thomas Tarcza
*Assistant Examiner* — Adam Tissot
(74) *Attorney, Agent, or Firm* — Baker Hostetler LLP

(57) ABSTRACT

The invention consists in merging together the predicted and measured meteorological data to supply them to the flight prediction calculation system so as to smooth the discontinuities brought about in the prior art by the simple update which is carried out. This merging is advantageously done by linear weighting of the data, the weighting coefficient depending upon the positioning in vertical and horizontal distances between the predicted point and the aeroplane in relation to chosen thresholds.

10 Claims, 2 Drawing Sheets

SYSTEM AND METHOD FOR MERGING METEOROLOGICAL DATA PREDICTED AND MEASURED ON AN AIRCRAFT

CROSS-REFERENCE TO RELATED APPLICATIONS

This application claims priority of French application no. FR 0804878, filed Sep. 5, 2008, the disclosure of which is hereby incorporated by reference in its entirety.

FIELD OF THE INVENTION

The present invention belongs to the field of onboard flight management systems (FMS) on aircraft. More specifically, it applies to the flight prediction (PRED) and trajectory (TRAJ) modules which, for a horizontal trajectory of the aircraft linking the waypoints of a flight plan (FPLN), respectively calculate the horizontal and vertical trajectories that the aircraft must follow.

BACKGROUND OF THE INVENTION

The temperature and wind atmospheric data are important parameters in the calculations. The flight management systems of the prior art offer the pilot the possibility of defining a temperature profile throughout a flight plan via the definition of altitude/temperature pairings at a number of waypoints of the altitude profile. A wind profile can also be defined by direction/intensity pairings on a number of flight levels. These data are input by the pilot from information that he receives during the flight, notably the meteorological information at the arrival airport. However, these data are obtained from probes measurements that may be old because the wind data are generally entered when preparing the flight and are rarely updated again. They therefore significantly differ from the dynamic data measured by the onboard sensors. Aircraft manufacturers therefore want the measured meteorological data to be regularly integrated into the flight plan prediction calculation. Integrating raw data at a defined frequency, which represents the state of the art, presents the drawback of creating discontinuities from one leg to another in front of the aeroplane and notably falsifying the transition calculations between legs.

SUMMARY OF THE INVENTION

The invention resolves this problem by providing a strategy for merging the measured and received meteorological data which smoothes the discontinuities at the boundaries of carefully selected prediction zones.

To this end, the invention provides a system for calculating flight predictions of an aircraft comprising a module for capturing first atmospheric data (WM, TM) in the vicinity of the aircraft, a module for inputting second atmospheric data (WF, TF) at waypoints in front of the aircraft, a module for merging said first and second data into third atmospheric data (W, T) to be used as input for calculating flight predictions, said merging being performed by calculating a linear weighting of the first and second data of coefficient K and formulae $W=WM\times(1-K)+WF\times K$, $T=TM\times(1-K)+TF\times K$, wherein said coefficient K is a function of the values of the projected horizontal X and vertical H distances between the predicted point and the aeroplane position in relation to chosen thresholds $D_a$, $D_b$, $H_a$, $H_b$.

Advantageously, said first, second and third meteorological data comprise temperature indicators and wind indicators.

Advantageously, said thresholds $D_a$, $D_b$, $H_a$, $H_b$ are chosen according to at least one of the parameters selected from the group comprising horizontal speed of the aeroplane, rate of climb, average leg length, reliability and frequency of the refreshing of the meteorological forecasts horizontally and vertically, FMS PRED refreshing frequency.

Advantageously, said thresholds $D_a$, $D_b$, $H_a$, $H_b$ may be chosen with different values in one and the same flight plan, the criteria for choosing different values belonging to the group comprising flight phase and geolocation.

Advantageously, if $X \le D_a$ and $H \le H_a$, then K=0.

Advantageously, if $X \ge D_b$ and $H \ge H_b$, then K=1.

Advantageously, if $D_a < X < D_b$ and $H_a < H < H_b$, then $K=(X-D_a)/(D_b-D_a)$.

Advantageously, if $D_a < X < D_b$ and $H_a < H < H_b$, $K=\text{Min}(1; (H-H_a)/(H_b-H_a)+(X-D_a)/(D_b-D_a))$.

The invention also discloses a method for calculating flight predictions of an aircraft comprising a step for capturing first atmospheric data (WM, TM) in the vicinity of the aircraft, a step for inputting second atmospheric data (WF, TF) at waypoints in front of the aircraft, a step for merging said first and second data into third atmospheric data (W, T) to be used as input for calculating flight predictions, said merging being performed by linear weighting of the first and second data of coefficient K and formulae $W=WM\times(1-K)+WF\times K$, $T=TM\times(1-K)+TF\times K$, wherein said coefficient K is a function of the values of the projected horizontal X and vertical H distances between the predicted point and the aeroplane position in relation to chosen thresholds $D_a$, $D_b$, $H_a$, $H_b$.

The invention offers the advantage of being simple to implement and therefore offers very low development and validation costs. It also offers high efficiency when the trend of the data is linear. Furthermore, the solution is highly flexible, allowing the data to be merged only by altitude or only by distance or by both together; a number of trend laws can be easily integrated; the method can also be adapted to the case of a number of different defined wind and/or temperature profiles for each flight phase.

BRIEF DESCRIPTION OF THE DRAWINGS

The invention will be better understood, and its various characteristics and advantages will become apparent, from the following description of a number of exemplary embodiments, and its appended figures in which.

DETAILED DESCRIPTION

Unless stated otherwise, in the description and the figures, the symbols, acronyms and abbreviations have the meanings indicated in the table below.

| Symbol/Abbreviation | Meaning |
| --- | --- |
| ADC | Air Data Computer |
| ADIRU | Air Data Inertial Reference Unit |
| AFDX | Avionics Full DupleX switched Ethernet |
| ALT | Altitude |
| CLB | Climb |
| CRZ | Cruise |
| DES | Descent |
| FMS | Flight Management System |
| FPLN | Flight Plan |
| GNADIRS | Global Navigation Air Data Inertial Reference System |
| GNSS | Global Navigation Satellite System |
| IMA | Integrated Modular Avionics |
| IRS | Inertial Reference System |
| NM | Nautical Miles (1 NM = 1.856 km) |
| PRED | Prediction |
| SAT | Static Air Temperature |
| TAT | Total Air Temperature |
| TRAJ | Trajectory |

Figure 1:
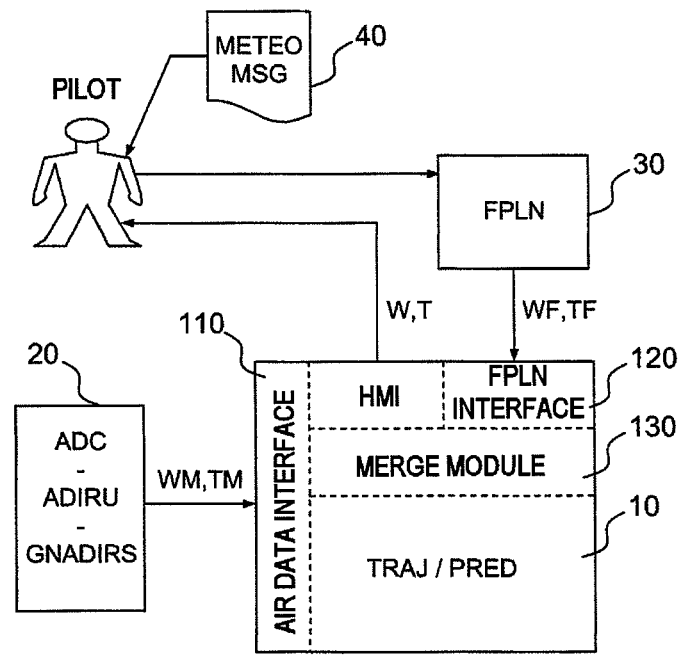
FIG. 1 represents the interaction of the data input by the pilot and the sensor data in using the wind in the predictions of a flight plan.

FIG. 1 represents the interaction of the data input by the pilot and of the sensor data in using the wind in the predictions of a flight plan.

The pilot updates the data in the flight plan FPLN, 30, according to the information he has, on the one hand the meteorological messages that he receives from the ground 40, on the other hand the information originating from the prediction calculation system 10. The pilot can also define and input in the FPLN 30 wind and temperature variation profiles that are taken into account in the calculation of the predictions via an FPLN interface 120. These profiles are simple models of propagation of the measurements at a point towards the front of the aeroplane according to the trend of the altitude. Generally, a propagation is made in both vertical and horizontal axes in the cruising phase CRZ and only on the vertical axis in the climb CLB and descent DES phases. Projected wind and temperature data WF, TF are passed via the interface 120 to the TRAJ/PRED system.

The prediction calculation system uses an interface 110 for capturing meteorological data to process the data originating from the computer 20. Depending on the architecture selected by the aircraft manufacturer, this computer may be a computer of atmospheric data in the environment of the aeroplane (ADC, Air Data Computer) and process only the latter: wind by direction and intensity, temperature (SAT, Static Air Temperature, or TAT, Total Air Temperature, which takes into account the dynamics). The selected computer can jointly process the atmospheric data and the inertial data (ADIRU, Air Data Inertial Reference Unit) or additionally process the navigation data obtained from the GNSS (GNADIRS or Global Navigation Air Data Inertial Reference System). In all three cases, basic measurements giving the air speed are obtained from a plurality of sensors comprising Pitot tubes used to measure the dynamic pressure and the static pressure, the difference of which constitutes the air speed. By reconciling the air speed measurements and the ground speed measurements output by the inertial unit and the GNSS, the wind can be deduced therefrom. The temperature sensors measure the total temperature (TAT) from which the static temperature (SAT) is deduced by taking into account the air speed. The measured wind and temperature data WM, TM are then passed to the TRAJ/PRED system.

In the prior art, the merging applied by the module 130 is a simple replacement of the projected data with the data measured at the moment when the predicted point is flown, which inevitably leads to discontinuity and does not make it possible to optimize the calculation of the predictions, notably the transitions between legs.

According to the invention, the merging is done so as to smooth the transitions between predicted data and measured data by applying a propagation model, which is both simple and automatic, while the definition of the propagation profiles by the pilot in the flight plan is left to the initiative of the pilot.

Figure 2:
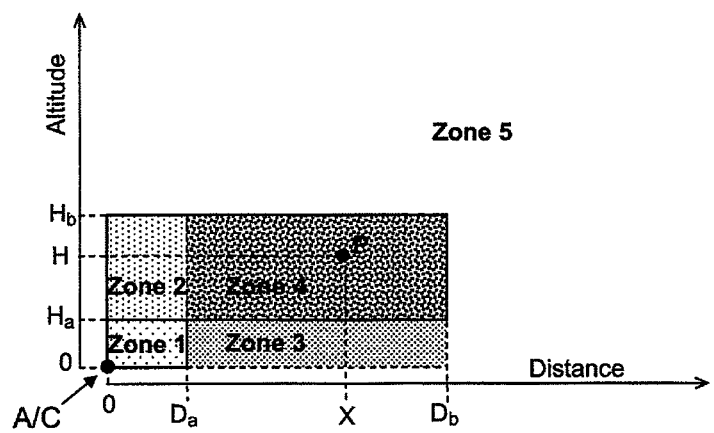
FIG. 2 represents the various parts of the flight plan in which the data merging method according to a particular embodiment of the invention is applied.

FIG. 2 represents the various parts of the flight plan in which the data merging method according to a particular embodiment of the invention is applied.

According to the invention, the merging (or "blending") between measured data and projected data is done by taking into account as predicted data a weighting of the measured data WM, TM, and of the projected data WF, TF.

This weighting is preferentially linear because of the simplicity of this choice. In this case, the predicted values W and T are calculated by the following formulae:

$$W = WM \times (1-K) + WF \times K \quad (1)$$

$$T = TM \times (1-K) + TF \times K \quad (2)$$

in which K is a weighting coefficient. It will be seen that K varies according to parameters chosen as a function of the distance between the projection point and the position of the aeroplane.

It is possible to envisage other types of weighting, for example a harmonic weighting, or other types of non-linear weighting in which the percentage of measured and projected data taken into account itself varies according to the distance from the projection point to the aeroplane.

In the linear weighting mode described here as a main, but non-exclusive, mode, zones are advantageously defined where the weighting is calculated differently. In FIG. 2, 5 zones are thus defined by two horizontal $D_a$, $D_b$ and vertical $H_a$, $H_b$ distance thresholds with which are compared the horizontal X and vertical H distances between the predicted point P and the position of the aeroplane A/C where the data from the sensors are measured. We will come back further in the description to the choice of these thresholds.

At the two edges respectively defined by the inequalities (3) and (4):

$$X \leq D_a \text{ and } H \leq H_a \quad (3)$$

$$X \geq D_b \text{ and } H \geq H_b \quad (4)$$

there are two zones (zone 1 and zone 5) where the predicted data are taken to be equal to the measured data (zone 1) or to the predicted data (zone 5). In the first case, K is taken to be equal to 0 in the formulae (1) and (2). In the second case, K is taken to be equal to 1.

There are then two zones where the weighting is done only by altitude (zone 2) or by distance (zone 3). These zones are defined by the inequalities (5) and (6):

$$X \leq D_a \text{ and } H_a < H < H_b \quad (5)$$

$$D_a < X < D_b \text{ and } H_a < H < H_b \quad (6)$$

The coefficient K is then calculated respectively by the formulae (7) and (8) below:

$$K = (H - H_a)/(H_b - H_a) \quad (7)$$

$$K = (X - D_a)/(D_b - D_a) \quad (8)$$

Finally, in a zone 4, the blending is done on both axes. This zone is defined by the inequality (9):

$$D_a < X < D_b \text{ and } H_a < H < H_b \quad (9)$$

In this case, the coefficient K is calculated by the formula (10):

$$K = \text{Min}(1; (H-H_a)/(H_b-H_a) + (X-D_a)/(D_b-D_a)) \quad (10)$$

We now need to define the thresholds. There is necessarily an empirical nature to this definition. Thus, it will be noted that, for a given carrier (Airbus A400M, registered trademark), the following threshold values give good results for the wind data in the CRZ phase:

$H_a$=500 feet
$H_b$=2 000 feet
$D_a$=10 NM
$D_b$=100 NM

These parameters have been determined for a horizontal speed of 400 KTS and a rate of climb of 3000 feet in one minute, also taking into account the fact that the weather forecasts are defined in a cell of 5000 feet altitude. For the definition of the minimum distance threshold ($D_a$), the distance of 10 NM, which roughly corresponds, in the CLB and DES phases, to a leg in front of the aeroplane, is taken as the limit below which the measured data only are used. This distance is traveled in 1.5 minutes at 400 KTS, a time during which the PREDs will normally have been refreshed 6 times (refresh every 15 seconds for the first-level FMSs of the aeroplanes from the Airbus range) before the weather forecasts are taken into account. The distance limit beyond which the data input by the pilot only are used ($D_b$) is taken to be equal to the equivalent of 10 legs (100 NM horizontally or 15 minutes of flight at 400 KTS) to take account of the fact that the forecasts input by the pilot are unreliable horizontally and that there is an interest in postponing their being 100% taken into account as long as possible. On the other hand, the vertical forecasts are more reliable, notably in the CLB and DES phases, since they are generated from measurements performed in the immediate environment of the airports with trend rules that are well mastered. Consequently, the cell is taken to be narrower in altitude than in distance. The lower limit $H_a$ corresponds to 10 seconds of climb at a rate of climb of 3000 feet per minute; during this time, the PREDs are not refreshed and all the measured data are used. Between this lower limit and the upper limit, 30 seconds and 2 PRED refresh cycles elapse; changing weather forecasts can therefore be adequately taken into account. Therefore, by taking into account the parameters of horizontal speed of the aeroplane, rate of climb, average length of a leg, reliability and frequency of the refreshing of the weather forecasts horizontally and vertically, FMS PRED refreshing frequency, thresholds $D_a$, $D_b$, $H_a$, $H_b$ suited to a given operational context can be established.

It is also known that the wind changes more in altitude than in distance. In the CLB and DES phases, there are a number of possibilities for defining the thresholds, the choice ultimately depending greatly on the operational procedures. It is perfectly possible for a decision to be made not to perform any horizontal blending in these phases. In this case, $D_a$ and $D_b$ will be taken as being equal to the destination distance to perform the predictions relative to these phases. This option is only one particular case of a possibility offered by the invention to use values $D_a$, $D_b$, $H_a$, $H_b$ suited to a given flight phase, or even dependent in the CLB and DES phases on the landing or take-off airports to take account of the different procedures that may be imposed.

Figure 3:
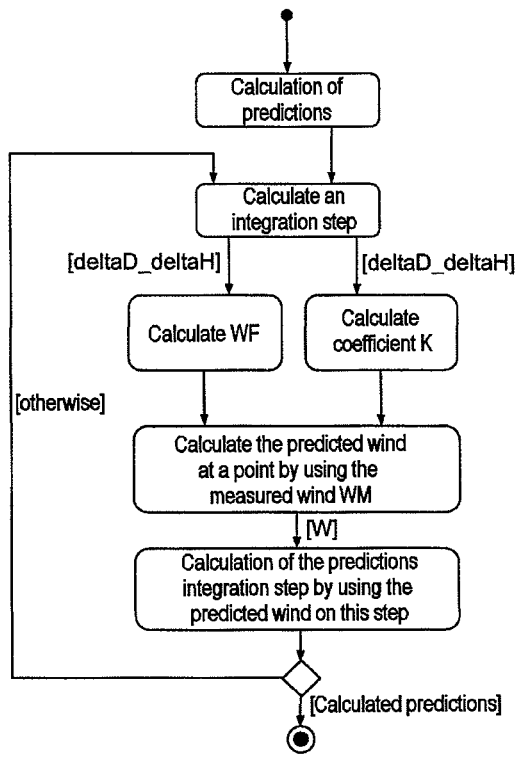
FIG. 3 represents a general flow diagram of the calculation of the predictions using the different wind values in an embodiment of the invention.

FIG. 3 represents a general flow diagram of the prediction calculation using the different wind values in one embodiment of the invention. A similar flow diagram defines the sequencing of the processing operations relating to the temperature data.

The first step of the process consists in calculating the integration step deltaD_deltaH. This depends on the waypoints on the route and the prediction calculation modalities. Two steps are then executed in parallel: the aim of one is to calculate the projected data, WF in this case, from those input by the pilot (raw data at a number of points, estimated by the pilot based on meteorological information and predicted data from the prior loops at his disposal); the other is for calculating the weighting coefficient K between measured data WM and predicted data WF. When these two steps have been calculated, it is possible to perform the calculation of the predicted wind W using the formulae indicated in the commentary to FIG. 2. The calculation of the predictions is then repeated until the loop exit condition is obtained, that is to say, when all the flight plan has been predicted.

Figure 4:
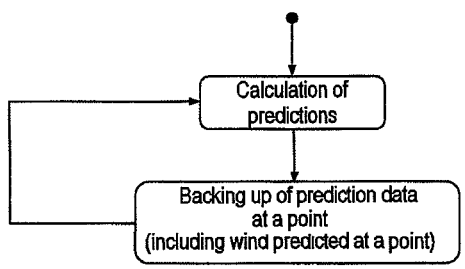
FIG. 4 represents the function for backing up wind data at a given predicted point for pilot consultation in an embodiment of the invention.

FIG. 4 represents the function for backing up wind data at a given predicted point for pilot consultation in an embodiment of the invention. The function for backing up predicted data at a point is a conventional function that the prediction calculation system handles for most of the predicted data. In this particular case, the consultation by the pilot of the predicted data plays a particular role since, on seeing the predicted data, the pilot may be led to modify the data projected by the flight plan, which will lead to a modification of the predicted data themselves.

The invention can be implemented in a prior art hardware architecture comprising a set of flight computers organized, for example, in an integrated modular architecture (IMA) and interlinked by an AFDX bus, with the redundancies needed to ensure certification of the aircraft. In terms of software, the invention makes it possible to clearly separate the functions of integrating sensor data, projecting data projection and merging measured and projected data. This greatly facilitates the design and development of the different layers of the software that are largely independent of one another. Thus, changes to the specifications on one of these layers will not impose any new overall design or complete redevelopment or new overall certification. Corrective and upgrade maintenance are therefore greatly facilitated and the cost of these operations is significantly reduced. New projection models in the FPLN, such as the possibility of defining a number of wind and temperature profiles for the CLB and DES phases or a number of tropopause altitudes along one and the same flight plan, can be taken into account without any modification to the merging function itself.

The examples described hereinabove are given to illustrate embodiments of the invention. They in no way limit the scope of the invention which is defined by the following claims.

The invention claimed is:

1. A system for calculating flight predictions of an aircraft, the system comprising:
   at least one sensor configured to capture first atmospheric data (WM, TM) in the vicinity of the aircraft;
   an interface to a computing capability configured to input second atmospheric data (WF, TF) at waypoints in front of the aircraft; and
   said computing capability being configured to merge said first and second atmospheric data into third atmospheric data (W, T) for calculating flight predictions which are substantially continuous from one leg of said flight predictions to another leg in front of the aircraft, wherein said first and second atmospheric data are merged by calculating a linear weighting of the first and second atmospheric data according to coefficient K and formulae W=WM×(1−K)+WF×K and T=TM×(1−K)+TF×K, and wherein said coefficient K is a function of values of projected horizontal X and vertical H distances between a predicted point and a position of the aircraft in relation to predetermined thresholds $D_a$, $D_b$, $H_a$, $H_b$.

2. The system of claim 1, wherein said first, second and third atmospheric data comprise temperature indicators and wind indicators.

3. The system of claim 1, wherein said predetermined thresholds $D_a$, $D_b$, $H_a$, $H_b$ are chosen according to at least one parameter selected from the group comprising horizontal speed of the aircraft, rate of climb of the aircraft, average leg length, reliability, refreshing frequency of atmospheric forecasts horizontally and vertically, refreshing frequency of system predictions.

4. The system of claim 1, wherein said predetermined thresholds $D_a$, $D_b$, $H_a$, $H_b$ have different values in the same flight plan, the different values being chosen according to criteria selected from the group comprising flight phase and geolocation.

5. The system of claim 1, wherein, if $X \leq D_a$ and $H \leq H_a$, then K=0.

6. The system of claim 1, wherein, if $X \geq D_b$ and $H \geq H_b$, then K=1.

7. The system of claim 1, wherein, if $X \leq D_a$ and $H_a < H < H_b$, then $K=(H-H_a)/(H_b-H_a)$.

8. The system of claim 1, wherein, if $D_a < X < D_b$ and $H_a < H < H_b$, then $K=(X-D_a)/(D_b-D_a)$.

9. The system of claim 1, wherein, if $D_a < X < D_b$ and $H_a < H < H_b$, then $K=\text{Min}(1; (H-H_a)/(H_b-H_a)+(X-D_a)/(D_b-D_a))$.

10. A method for calculating flight predictions of an aircraft, the method comprising:

capturing, at least one sensor, first atmospheric data (WM, TM) in the vicinity of the aircraft;

inputting, using an interface to a computing capability, second atmospheric data (WF, TF) at waypoints in front of the aircraft; and merging, using said computing capability, said first and second atmospheric data into third atmospheric data (W, T) for calculating flight predictions which are substantially continuous from one leg of said flight predictions to another leg in front of the aircraft, wherein said first and second atmospheric data are merged by linear weighting of the first and second atmospheric data according to coefficient K and formulae $W=WM\times(1-K)+WF\times K$ and $T=TM\times(1-K)+TF\times K$, and wherein said coefficient K is a function of values of projected horizontal X and vertical H distances between a predicted point and a position of the aircraft in relation to predetermined thresholds $D_a$, $D_b$, $H_a$, $H_b$.

* * * * *